United States Patent
Culbert

(10) Patent No.: US 9,632,566 B2
(45) Date of Patent: Apr. 25, 2017

(54) DYNAMICALLY CONTROLLING POWER BASED ON WORK-LOOP PERFORMANCE

(71) Applicant: Apple Inc., Cupertino, CA (US)

(72) Inventor: Daniel J. Culbert, Los Gatos, CA (US)

(73) Assignee: Apple Inc., Cupertino, CA (US)

(*) Notice: Subject to any disclaimer, the term of this patent is extended or adjusted under 35 U.S.C. 154(b) by 627 days.

(21) Appl. No.: 13/629,365

(22) Filed: Sep. 27, 2012

(65) Prior Publication Data

US 2014/0089694 A1   Mar. 27, 2014

(51) Int. Cl.
*G06F 1/26* (2006.01)
*G06F 1/32* (2006.01)
*G06F 9/48* (2006.01)

(52) U.S. Cl.
CPC ............ *G06F 1/329* (2013.01); *G06F 9/4893* (2013.01); *Y02B 60/144* (2013.01)

(58) Field of Classification Search
CPC ....................................................... G06F 1/329
USPC ................................................ 713/320, 300
See application file for complete search history.

(56) References Cited

U.S. PATENT DOCUMENTS

| | | | |
|---|---|---|---|
| 8,539,491 B1* | 9/2013 | Small et al. .................. | 718/102 |
| 2005/0243366 A1* | 11/2005 | Fukuda .............. | G06Q 10/0875 358/1.15 |
| 2006/0218558 A1* | 9/2006 | Torii et al. ..................... | 718/107 |
| 2007/0011476 A1* | 1/2007 | Flautner et al. .............. | 713/300 |
| 2008/0162965 A1* | 7/2008 | Marinas et al. .............. | 713/320 |
| 2009/0037926 A1* | 2/2009 | Dinda et al. .................. | 718/107 |
| 2011/0022868 A1* | 1/2011 | Harchol-Balter et al. .... | 713/323 |
| 2011/0231026 A1* | 9/2011 | Yaoyama ...................... | 700/291 |
| 2012/0066683 A1* | 3/2012 | Srinath ................. | G06F 9/4887 718/102 |
| 2012/0185706 A1* | 7/2012 | Sistla .................... | G06F 1/3206 713/300 |
| 2013/0346249 A1* | 12/2013 | Li .......................... | G06Q 10/10 705/26.61 |

\* cited by examiner

*Primary Examiner* — Robert Cassity
(74) *Attorney, Agent, or Firm* — Blank Rome LLP

(57) ABSTRACT

The present embodiments provide a system that dynamically controls power consumption in a computing device. During operation, the system measures the performance of the computing device while executing a work-loop. Next, the system determines a derived completion time for the work-loop based on the measured performance. (For example, the derived completion time can be an expected completion time, a maximum completion time, or more generally a completion time distribution.) The system then determines a deadline-proximity for the work-loop based on a comparison between the derived completion time and a deadline for the work-loop. (For example, the deadline-proximity can be an expected deadline-proximity, a minimum deadline-proximity, or more generally a deadline-proximity distribution.) Finally, the system controls the power consumption of the computing device based on the determined deadline-proximity for the work-loop.

41 Claims, 4 Drawing Sheets

DYNAMICALLY CONTROLLING POWER BASED ON WORK-LOOP PERFORMANCE

BACKGROUND

Field

The disclosed embodiments generally relate to power-management techniques for computing devices. More specifically, the disclosed embodiments relate to a technique for dynamically controlling power in a computing device based on empirically determined work-loop deadlines.

Related Art

In order to optimize battery life, a portable computing system often reduces power consumption when the system is idle. This is typically done by powering down system modules or reducing clock frequencies and voltage levels when the system detects an idle period. When the system subsequently detects an increase in workload, it is desirable for the system to rapidly power up the system modules and increase the clock frequencies and voltage levels to their normal operating levels.

While performing these power-management operations, it is desirable to avoid large latencies or overreactions to the current state of the system. In order to accomplish this, a critical piece of information that must be determined is an estimate of how busy the system will be in the future.

Traditionally, real-time operating systems were designed to make predictions about metrics of running tasks, such as future workloads, periodicity of tasks, or upcoming deadlines. In harmonic or other perfectly periodic real-time systems, optimizing power is straightforward. Such systems have an easily calculated periodic workload, and one simply adjusts the power to accommodate this workload. In the class of real-time systems, earliest-deadline-first (EDF) scheduling is one of the most effective techniques for real-time scheduling. It optimizes throughput, yet does not require fixed workloads, and does not require a periodic relationship between running tasks. Most portable computing systems do not operate in a perfectly periodic environment, which makes EDF an optimal real-time scheduling choice in terms of throughput, but restricts the ability to estimate the power required to meet the deadline of each running task.

Hence, what is needed is a technique for optimizing power management for a portable computing device in an environment with less-predictable workloads.

SUMMARY

The present embodiments provide a system that dynamically controls power consumption in a computing device. During operation, the system measures the performance of the computing device while executing a work-loop. Next, the system determines a "derived completion time" for the work-loop based on the measured performance. (For example, the derived completion time can be an expected completion time, a maximum completion time, or more generally a completion time distribution.) The system then determines a deadline-proximity for the work-loop based on a comparison between the derived completion time and a deadline for the work-loop. (For example, the deadline-proximity can be an expected deadline-proximity, a minimum deadline-proximity, or more generally a deadline-proximity distribution.) Finally, the system controls the power consumption of the computing device based on the determined deadline-proximity for the work-loop.

In some embodiments, controlling the power consumption of the computing device involves considering deadline-proximities for multiple work-loops executing on the computing device.

In some embodiments, the system determines the deadline for the work-loop by obtaining the deadline from an application associated with the work-loop.

In some embodiments, the system determines the deadline for the work-loop based on measurements of a frequency at which the work-loop is started.

In some embodiments, measuring the performance involves making calls to performance-measurement functions through an application programming interface (API) while executing the work-loop. These performance-measurement functions signal a start of the work-loop and an end of the work-loop.

In some embodiments, measuring the performance involves performing multiple measurements of a completion time for the work-loop.

In some embodiments, multiple measurements of work-loop completion times, and deadline-proximity values, are obtained to determine a statistical distribution for completion times and deadline proximities for the work-loop. The system then uses the determined statistical distribution to determine a power/performance setting for the computing device that has a probability p of causing a missed deadline for the work-loop, where p is typically set to be very small, if not zero.

In some embodiments, controlling the power consumption involves controlling a power-performance state (P state) of a processor in the computing device, wherein the P state determines a clock speed and/or an operating voltage of the processor.

In some embodiments, controlling the power consumption involves controlling a CPU-power state (C state) for a processor in the computing device, wherein the C state determines whether the processor is in: an operating state, a halted state; or a sleep state.

In some embodiments, controlling the power consumption involves scheduling threads to run on one or more processor cores in the computing device based on power-consumption considerations and the one or more work-loop deadlines.

In some embodiments, scheduling the threads involves: scheduling the threads to run in parallel on the same core; scheduling the threads to run serially on the same core; or scheduling the threads to run in parallel on different cores.

In some embodiments, the computing device comprises a portable computing device.

DETAILED DESCRIPTION

Figure 1:
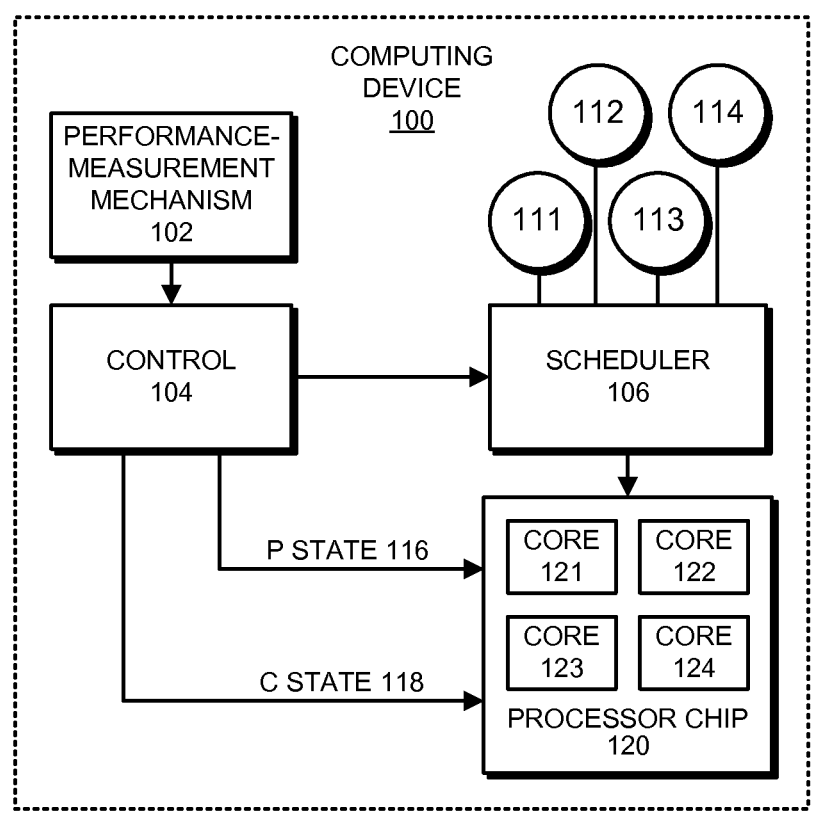
FIG. 1 illustrates a computing device in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, solid state storage devices, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments can effectively optimize battery life in a complex N-device system with a highly variable workload. In the EDF spirit, the system operates using upcoming deadlines. However, the system includes a number of additions to the conventional EDF scheduling technique. First, the system abandons the classic notion of an EDF thread or process; rather, the system operates based on "work-loops" $W_i$. These are loops that can span multiple threads, or multiple devices, but like a classic EDF thread or process, represent a body of work W that the system desires to accomplish in time T. A key metric for these work-loops is their upcoming deadline (or a variant thereof), represented by T. Unlike existing systems, the disclosed embodiments keep track of how long it takes to complete a task independently of where the task is executed. (For example, the task can be executed on N different devices.) Moreover, note that the disclosed embodiments gather statistics and then adjust power based on this "live" data, as opposed to other systems that perform adjustments based on predetermined measurements.

During operation, the system statistically measures the proximity of each work-loop $W_i$ to its upcoming deadline, or alternatively, its duty cycle, over an appropriate amount of time $T_m$, where $T_m \gg T$. In doing so, the system identifies boundary cases where this determined deadline must be adjusted. Next, based on these "statistical" measurements and adjustments, the power-management system performs adjustments to limit, in the statistical sense, excursions into the "power-deficit space" where power has been lowered too much and we miss one or more deadlines, and also to limit excursions into the "power-surplus space" where power has been raised too much, and we burn excessive power completing $W_i$.

Note that if every critical global work-loop is measured, the system has enough information to make a reasonable power adjustment. These power adjustments should ideally take into account how loaded the system is. If the system is highly loaded and is operating at a maximum power level, the probability that the system will miss a deadline if the power is adjusted downward is great. On the other hand, if the system is less loaded (e.g., is operating at ⅔ of a maximum possible load), the power level can be adjusted downward with less risk of missing a deadline.

To avoid missing deadlines, the system can initially operate at a maximum power level, and the system can monitor its workload for a "practically significant" amount of time to enable the system to take action based on the measurements. For example, assume we measure a work-loop for an audio buffer 3000 times. Based on this large number of measurements, we can determine statistically that we have a certain amount of headroom and variance. We can then dial the power down based on this variance, for example to come within 7 standard deviations of a deadline, which is close to a zero probability of missing the deadline. Moreover, if something dramatic happens with the system (we detect a change), we can return to the full-power mode so we do not miss any deadlines and can take additional measurements before lowering the power again.

Note that in some applications, such as real-time video streaming, the penalty for missing a deadline is only a video glitch, which is acceptable if it does not happen often. In these applications we can dial down the power to achieve whatever error rate we feel comfortable with.

Also, the tasks that we are concerned with include work that needs to be completed by a certain deadline. However, there exist other "background tasks" that do not have to be completed by a specific deadline, such as a "chron" process. We can consider such background processes to have a deadline of infinity.

We describe how the system operates in more detail below, but first we describe a computing device upon which the system operates.

Computing Device

FIG. 1 illustrates a computing device 100 in accordance with the disclosed embodiments. Computing device 100 can generally include any portable or non-portable computing system in which it is useful to save power, such as a smartphone, a tablet computer, a laptop computer, or a desktop computer system. Computing device 100 includes a performance-measurement mechanism 102, which can include various hardware or software components that can measure the performance of the system while executing work-loops. For example, performance-measurement mechanism 102 can make system calls at the start of each work-loop and at the end of each work-loop to determine a completion time for each work-loop.

Results from performance-measurement mechanism 102 feed into control mechanism 104 which uses the results to control a power-consumption level for computing device 100. This can be accomplished by feeding various control signals into processor chip 120, which includes multiple processor cores 121-124. These control signals can generally include any type of control signal that can be used to adjust the power/performance of computing device 100. For example, in one possible implementation that uses an INTEL™ chipset, these control signals can include a P state signal 116 that determines a clock speed and/or operating voltage of the processor. The control signals can also include a C state signal 118 that determines whether the processor is in: an operating state, a halted state; or a sleep state.

Controller 104 also communicates with a scheduler 106 which schedules various processes 111-114 to run on processor cores 121-124 within processor chip 120. As mentioned above, this can involve scheduling the threads to run: (1) in parallel on the same core; (2) serially on the same core; or (3) in parallel on different cores.

Process of Controlling Power Consumption

Figure 2:
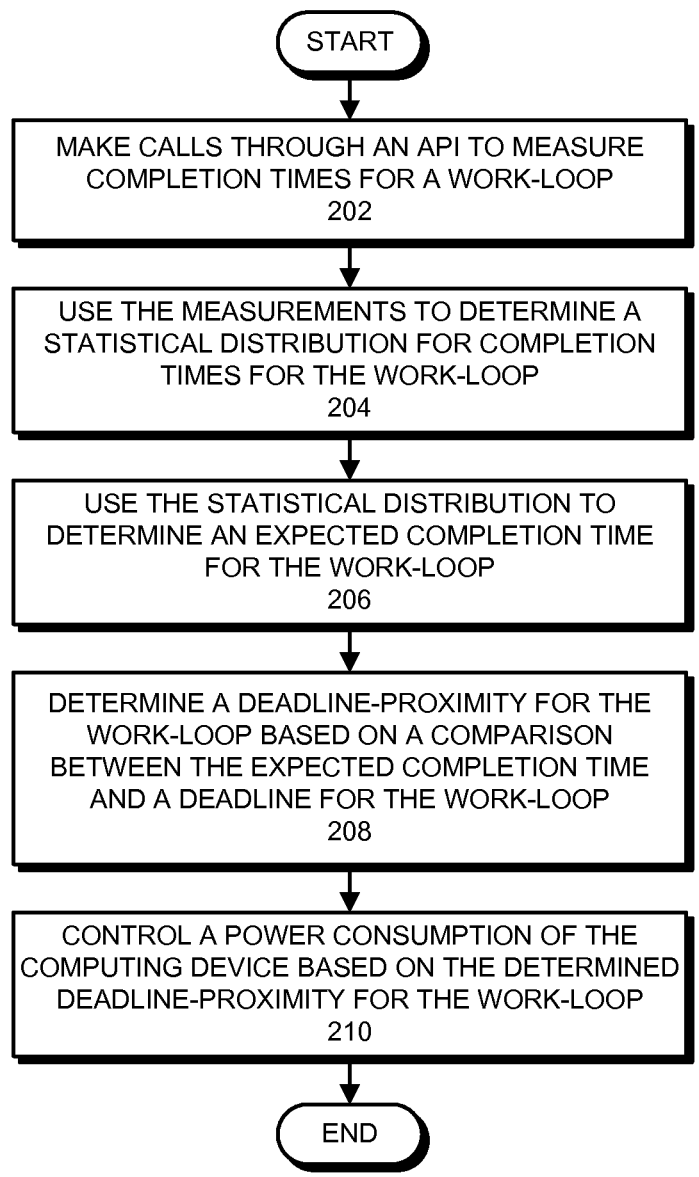
FIG. 2 presents a flow chart illustrating the process of controlling power consumption in a computing device in accordance with the disclosed embodiments.

FIG. 2 presents a flow chart illustrating the process of controlling power consumption in accordance with the disclosed embodiments. During operation, the system measures the performance of the computing device while executing a work-loop. These measurements can involve making calls to performance-measurement functions through an application programming interface (API) while executing the work-loop (step 202). For example, the system can call a "begin_work_loop(ID)" function (or system call) at the beginning of a work-loop and can call an "end_work_loop(ID)" function at the end of the work-loop. Note that the system makes these API calls based on an identifier (ID) for the specific work-loop.

Next, the system uses the measurements to determine a statistical distribution for completion times for the work-loop (step 204), and then uses the determined statistical distribution to determine a "derived completion time" for the work-loop (step 206). In one embodiment, the system determines the derived completion time based on the worst performer of all measurements. However, we can push the derived completion time closer to the average completion time, based on an empirically derived distribution to achieve more power savings at the cost at a small increase in the risk of missing a future deadline. The system then determines a deadline-proximity (or deadline proximity distribution) for the work-loop based on a comparison between the completion time distribution or derived completion time for the work-loop and a deadline for the work-loop (step 208). For example, the deadline-proximity can be determined by subtracting the derived completion time from the deadline for the work-loop.

Finally, the system controls the power consumption of the computing device based the determined deadline-proximity for the work-loop, and the granularity/flexibility of the power control for the system (step 208). (Note that this step can involve taking into account deadline-proximities for multiple work-loops.) As mentioned above, for an INTEL™ chip-set-specific implementation, controlling the power consumption can involve controlling a power-performance state (P state) of a processor in the computing device, wherein the P state determines a clock speed and/or an operating voltage of the processor. In addition, controlling the power consumption can involve controlling a CPU-power state (C state) for a processor in the computing device, wherein the C state determines whether the processor is in: an operating state, a halted state; or a sleep state of various levels of power savings and exit latency.

In other embodiments, controlling the power consumption can involve scheduling threads to run on one or more processor cores in the computing device based on power-consumption considerations and the one or more work-loop deadlines. For example, the system can schedule threads to: (1) run in parallel on the same core using hyper-threading or similar techniques when available; (2) run serially on the same core; or (3) run in parallel on different cores. Note that computer systems typically try not to schedule two threads to run on the same core. However, note that it is possible to save power by scheduling two threads on the same core, which eliminates the need to expend power to open up an additional core. We can alternatively hold off on running a thread on a core because the thread has a lot of headroom before its deadline. This enables another thread to finish executing on the core, so the system does not have to open another core. Without this knowledge about deadlines and headroom, the system must spawn the thread onto another core.

Determining Work-Loop Deadlines

Note that the work-loop deadline can be determined in a number of ways. In some cases, we can determine the deadline from the application itself. In other words, the application can tell us in advance what the upcoming deadline will be. In other embodiments, we can determine the deadline automatically by measuring the frequency at which a specific work-loop $W_i$ is started, and comparing its completion time against this frequency. For example, in an ideally created graphics-rendering work-loop doing animations at the screen refresh rate, we know when the next vertical blank will occur, and we can set the next vertical blank time as the next deadline that we can measure against. If that time is $Td_i$, and the completion time for that deadline/frame is $Tw_i$, then the distribution of each sample, for all i, of $(Td_i-Tw_i)$ is what we measure ourselves against.

Alternatively, we can relax the requirement of having a specific deadline, and instead look at relative completion times. For example, imagine the same graphics-rendering work-loop, which looks at when it started its rendering work, and sets the future deadline to 16 ms in the future (the same as 60 frames per second). In this case, we are trusting that the system is in phase, and that we are called at the right time to render a frame. We then assume the next deadline is: $Td_i$=current_time+16 ms and we can measure $Tw_i$ as usual.

Note that $Td_i$ is only needed to place a hard boundary that we do not want to cross, which occurs in a number of important media/realtime scenarios. However, there may be scenarios where the metric might be different. For example, we can refuse to let the distribution of $Tw_i$ change by more than a factor of K due to power/performance changes, which does not require us to determine deadlines $Td_i$, just expected completion times $Tw_i$.

Distribution of Completion Times

Figure 3:
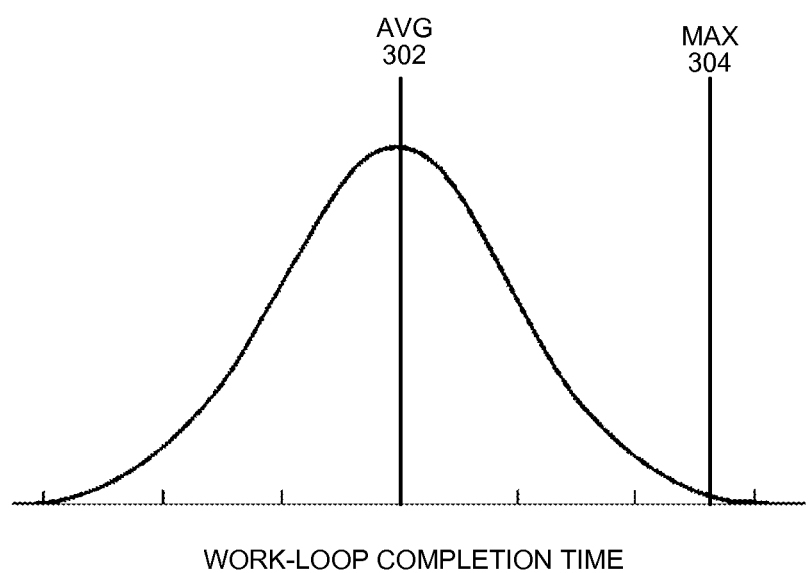
FIG. 3 illustrates a distribution of work-loop completion times in accordance with the disclosed embodiments.

FIG. 3 illustrates an exemplary distribution of work-loop completion times in accordance with the disclosed embodiments. Note that this distribution approximates a normal distribution centered around an average completion time (AVG) 302. Based on this distribution, we can determine a maximum completion time (MAX) 304 which has a very small probability of being exceeded. For example, as mentioned above, if we set MAX 304 to be seven standard deviations away from AVG 302, there is a close to zero probability of exceeding this completion time.

Exemplary Work-Loops

Figure 4:
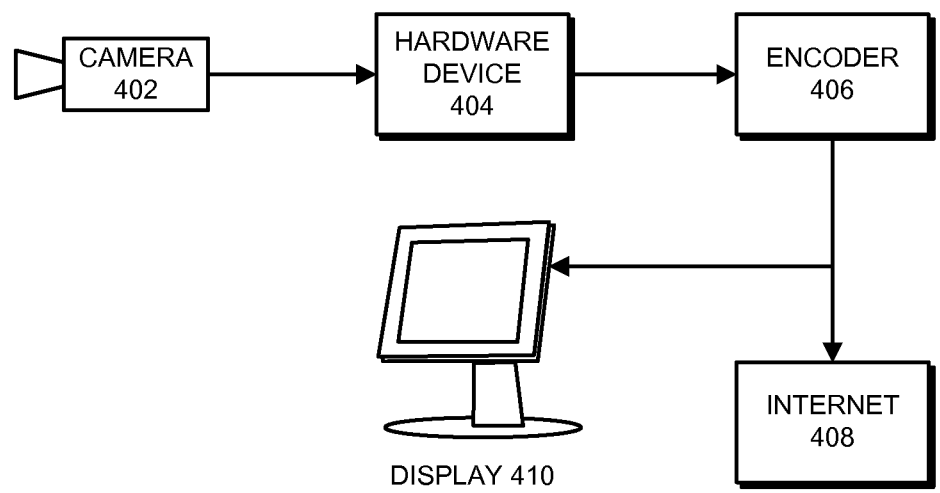
FIG. 4 illustrates exemplary work-loops in accordance with the disclosed embodiments.

FIG. 4 illustrates an exemplary system that includes two work-loops in accordance with the disclosed embodiments. This system includes a number of "work components" which can include hardware or software components. More specifically, the system includes a camera 402 which feeds a video stream into a hardware device 404 and then into a video encoder 406, which for example can compress or encrypt the video stream. Next, the system sends the video stream to a display 410 and at the same time sends the video stream to the Internet 408, which for example may be required in a "video chat" system. Note that the system includes two work-loops, a first work-loop and a second work-loop. Both work-loops start at camera 402 and proceed through hardware device 404 and encoder 406. The first work-loop then proceeds to display 410, which is the endpoint for the first work-loop. The second work-loop then proceeds to Internet 408 which is the endpoint for the second work-loop.

Note that it is possible for work-loops to span multiple hardware devices. Moreover, the above-described work-loop system is thread independent. This facilitates managing power globally (across the entire system) not just within the CPU cores themselves.

Moreover, in a system where more than one device can change power (e.g. a GPU and a CPU), the system can adjust the power of the device that maps best to these one or more of the following criteria: (1) the finest/smallest performance steps (this facilitates making small performance adjustments in situations where "headroom" is tight); (2) the largest headroom as measured by deadline proximity (i.e., the device that is the most idle); and (3) the largest power savings for a given amount of step (i.e., the device give us the best power savings for a given amount of performance loss).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for dynamically controlling power consumption of a computing system, comprising:
    obtaining a first set of indications, each indication acquired through an application program interface (API) and signaling a start of a work-loop being performed by a computing system;
    obtaining a second set of indications, each indication acquired through the API and signaling an end of the corresponding work-loop performed by the computing system;
    determining a statistical distribution for completion times for the work-loop based on the first set and second set of indications;
    determining a derived completion time for the work-loop based on the statistical distribution;
    determining a deadline-proximity for the work-loop based on a comparison between the derived completion time and a deadline for completion of the work-loop; and
    controlling a power consumption of the computing system based on the determined deadline-proximity for the work-loop.

2. The method of claim 1, wherein the computing system includes a plurality of processors, and wherein the work-loop is performed by two or more processors of the plurality of processors.

3. The method of claim 1, further comprising:
    determining the deadline for completion of the work-loop based on obtaining the deadline from an application associated with the work-loop.

4. The method of claim 1, further comprising:
    determining the deadline for completion of the work-loop based on a comparison between a frequency at which the work-loop is started and the determined completion.

5. The method of claim 1, wherein:
    acquiring each of the first set of indications comprises making a call to one or more performance-measurement functions through the API during performance of the work-loop, and
    acquiring each of the second set of indications comprises making a call to the one or more performance-measurement functions through the API during the corresponding performance of the work-loop.

6. The method of claim 5, wherein each of the calls for the first set and second set of indications is made using an identifier associated with the work-loop.

7. The method of claim 5, wherein determining the statistical distribution for the completion times for the work-loop comprises:
    determining multiple measurements of the completion time for the work-loop by the one or more performance-measurement functions based on the first set and second set of indications, and
    using the multiple measurements to determine the statistical distribution for the completion times for the work-loop.

8. The method of claim 1, wherein the derived completion time is:
    an expected completion time;
    a maximum completion time; or
    a completion time distribution.

9. The method of claim 1, wherein the deadline-proximity is:
    an expected deadline-proximity;
    a minimum deadline-proximity; or
    a deadline-proximity distribution.

10. The method of claim, 1 wherein controlling the power consumption of the computing system based on the determined deadline-proximity for the work-loop includes:
    adjusting a power-performance state (P state) of a processor of the computing system, wherein the P state determines at least one of a clock speed of the processor and an operating voltage of the processor.

11. The method of claim 1, wherein controlling the power consumption of the computing system based on the determined deadline-proximity for the work-loop includes:
    adjusting a CPU-power state (C state) for a processor of the computing system, wherein the C state determines whether the processor is in: an operating state, a halted state; or a sleep state.

12. The method of claim 1, wherein controlling the power consumption of the computing system based on the determined deadline-proximity for the work-loop includes:
    scheduling multiple threads to run on one or more processors of the computing system.

13. The method of claim 10, wherein scheduling the multiple threads involves:
    scheduling the multiple threads to run in parallel on the same processor;
    scheduling the multiple threads to run serially on the same processor; or
    scheduling the multiple threads to run in parallel on different processors.

14. The method of claim 1, wherein the work-loop is executed in sequence on multiple processors of the computing system.

15. The method of claim 14, wherein the work-loop includes at least one of:
    a process executed on at least one of the multiple processors; and a thread executed on at least one of the multiple processors.

16. The method of claim 1, wherein the computing system includes multiple hardware devices, wherein controlling the power consumption of the computing system based on the determined deadline-proximity for the work-loop includes selectively adjusting power consumption of one of the multiple hardware devices, and wherein one of the multiple hardware devices is at least one of the following:
a hardware device that is capable of performing smaller performance adjustments than all other ones of the multiple hardware devices;
a hardware device that is more idle than all other ones of the multiple hardware devices as measured with respect to the deadline-proximity; and
a hardware device that provides a larger power savings for a given amount of performance loss than all other ones of the multiple hardware devices.

17. An apparatus including one or more integrated circuits that dynamically controls power consumption of a computing system, comprising:
a measurement mechanism embodied in the one or more integrated circuits, the measurement mechanism configured to:
obtain a first set of indications, each indication acquired through an application programming interface (API) and signaling a start of a work-loop being performed by a computing system, and
obtain a second set of indications, each indication acquired through the API and signaling an end of the corresponding work-loop performed by the computing system;
a computation mechanism embodied in the one or more integrated circuits, the computation mechanism configured to:
determine a statistical distribution for completion times for the work-loop based on the first set and second set of indications;
determine a derived completion time for the work-loop based on the statistical distribution; and
determine a deadline-proximity for the work-loop based on a comparison between the derived completion time and a deadline for completion of the work-loop; and
a power-controlling mechanism embodied in the one or more integrated circuits, the power-controlling mechanism configured to:
control a power consumption of the computing system based the determined deadline-proximity for the work-loop.

18. The apparatus of claim 17, wherein the computing system includes a plurality of processors, and wherein the work-loop is performed by two or more processors of the plurality of processors.

19. The apparatus of claim 17, wherein the apparatus is further configured to determine the deadline for completion of the work-loop based on obtaining the deadline from an application associated with the work-loop.

20. The apparatus of claim 17, wherein the apparatus is further configured to determine the deadline for completion of the work-loop based on a comparison between a frequency at which the work-loop is started and the determined completion time.

21. The apparatus of claim 17, wherein
acquiring each of the first set of indications comprises making a call to one or more performance-measurement functions through the API during performance of the work-loop, and
acquiring each of the second set of indications comprises making a call to the one or more performance-measurement functions through the API during the corresponding performance of the work-loop.

22. The apparatus of claim 17, wherein each of the calls for the first set and second set of indications is made using an identifier associated with the work-loop.

23. The apparatus of claim 21, wherein the computation mechanism is further configured to:
determine multiple measurements of the completion time for the work-loop by the one or more performance-measurement functions based on the first set and second set of indications, and
use the multiple measurements to determine the statistical distribution for the completion times for the work-loop.

24. The apparatus of claim 17, wherein the derived completion time is:
an expected completion time;
a maximum completion time; or
a completion time distribution.

25. The apparatus of claim 17, wherein the deadline-proximity is:
an expected deadline-proximity;
a minimum deadline-proximity; or
a deadline-proximity distribution.

26. The apparatus of claim 17, wherein the power-controlling mechanism is configured to control the power consumption of the computing system based on the determined deadline-proximity for the work-loop by:
adjusting a power-performance state (P state) of a processor of the computing system, wherein the P state determines at least one of a clock speed of the processor and an operating voltage of the processor.

27. The apparatus of claim 17, wherein the power-controlling mechanism is configured to control the power consumption of the computing system based on the determined deadline-proximity for the work-loop by:
adjusting a CPU-power state (C state) for a processor of the computing system, wherein the C state determines whether the processor is in: an operating state, a halted state; or a sleep state.

28. The apparatus of claim 17, wherein the power-controlling mechanism is configured to control the power consumption of the computing system based on the determined deadline-proximity for the work-loop by:
scheduling multiple threads to run on one or more processors of the computing system.

29. The apparatus of claim 28, wherein scheduling the multiple threads involves:
scheduling the multiple threads to run in parallel on the same processor;
scheduling the multiple threads to run serially on the same processor; or
scheduling the multiple threads to run in parallel on different processors.

30. The apparatus of claim 17, wherein the work-loop is executed in sequence on multiple processors of the computing system.

31. The apparatus of claim 30, wherein the work-loop includes at least one of:
a process executed on at least one of the multiple processors; and a thread executed on at least one of the multiple processors.

32. The apparatus of claim 17,
wherein the computing system includes multiple hardware devices, wherein the power-controlling mechanism is configured to control the power consumption of the computing system based on the determined deadline-proximity for the work-loop by selectively adjusting power consumption of one of the multiple hardware, and wherein the one of the multiple hardware devices is at least one of the following:
  a hardware device that is capable of performing smaller performance adjustments than all other ones of the multiple hardware devices;
  a hardware device that is more idle than all other ones of the multiple hardware devices as measured with respect to the deadline-proximity; and
  a hardware device that provides a larger power savings for a given amount of performance loss than all other ones of the multiple hardware devices.

33. A non-transitory computer-readable storage medium storing instructions that, when executed by a computing system, cause the computing system to:
  obtain a first set of indications, each indication acquired through an application programming interface (API) and signaling a start of a work-loop being performed by a computing system;
  obtain a second set of indications, each indication acquired through the API and signaling an end of the corresponding work-loop performed by the computing system;
  determine a statistical distribution for completion times for the work-loop based on the first set and second set of indications;
  determine a derived completion time for the work-loop based on the statistical distribution;
  determine a deadline-proximity for the work-loop based on a comparison between the derived completion time and a deadline for completion of the work-loop; and
  control a power consumption of the computing system based on the determined deadline-proximity for the work-loop.

34. The non-transitory computer-readable storage medium of claim 33, wherein the computing system includes a plurality of processors, and wherein the work-loop is performed by two or more processors of the plurality of processors.

35. The non-transitory computer-readable storage medium of claim 33, further comprising instructions to:
  determine the deadline for completion of the work-loop based on obtaining the deadline from an application associated with the work-loop.

36. The non-transitory computer-readable storage medium of claim 33, further comprising instructions to:
  determine the deadline for completion of the work-loop based on a comparison between a frequency at which the work-loop is started and the determined completion time.

37. The non-transitory computer-readable storage medium of claim 33, wherein:
  acquiring each of the first set of indications comprises making a call to one or more performance-measurement functions through the API during performance of the work-loop, and
  acquiring each of the second set of indications comprises making a call to the one or more performance-measurement functions through the API during the corresponding performance of the work-loop.

38. The non-transitory computer-readable storage medium of claim 37, wherein each of calls for the first set and second set of indications is made using an identifier associated with the work-loop.

39. The non-transitory computer-readable storage medium of claim 37, wherein determining the derived completion time for the work-loop comprises:
  determining multiple measurements of the completion time for the work-loop by the one or more performance-measurement functions based on the first set and second set of indications; and
  using the multiple measurements to determine the statistical distribution for the completion times for the work-loop.

40. The non-transitory computer-readable storage medium of claim 33, wherein controlling the power consumption of the computing system based on the determined deadline-proximity for the work-loop includes at least one of:
  adjusting a power-performance state (P state) of a processor of the computing system, wherein the P state determines at least one of a clock speed of the processor and an operating voltage of the processor; and
  adjusting a CPU-power state (C state) for a processor of the computing system, wherein the C state determines whether the processor is in: an operating state, a halted state; or a sleep state.

41. The non-transitory computer-readable storage medium of claim 33, wherein controlling the power consumption of the computing system based on the determined deadline-proximity for the work-loop includes:
  scheduling multiple threads to run on one or more processors of the computing system.

* * * * *

UNITED STATES PATENT AND TRADEMARK OFFICE
CERTIFICATE OF CORRECTION

PATENT NO. : 9,632,566 B2  
APPLICATION NO. : 13/629365  
DATED : April 25, 2017  
INVENTOR(S) : Daniel J. Culbert Page 1 of 1

It is certified that error appears in the above-identified patent and that said Letters Patent is hereby corrected as shown below:

In the Claims

Column 7, Lines 66-67: delete the word "completion." and insert the phrase --completion time.--;

Column 8, Line 53: delete the phrase "claim 10" and insert the phrase --claim 12--;

Column 9, Line 52: delete the phrase "based the" and insert the phrase --based on the--.

Signed and Sealed this  
Thirteenth Day of June, 2017

Joseph Matal  
*Performing the Functions and Duties of the*  
*Under Secretary of Commerce for Intellectual Property and*  
*Director of the United States Patent and Trademark Office*